United States Patent Office 2,911,387
Patented Nov. 3, 1959

2,911,387

POLYMER PHENOL HYDROPEROXIDES

Edwin J. Vandenberg, New Castle County, Del., assignor to Hercules Powder Company, Wilmington, Del., a corporation of Delaware No Drawing. Application July 6, 1954
Serial No. 441,680

3 Claims. (Cl. 260—47)

This invention relates to new polymeric phenols and, more particularly, to a polymer having recurring units containing an aryl nucleus and having a hydroxyl radical attached to at least one of the aryl nuclei in the polymer molecule.

In accordance with this invention it has been found that an entirely new class of polymeric phenols may be prepared by decomposing, in the presence of an acid catalyst, a polymer hydroperoxide containing aryl nuclei and having a hydroperoxide group attached to a carbon adjacent to at least one of the aryl nuclei, which carbon is not a part of the polymer chain. These new polymeric phenols are unique materials, combining the properties of phenolic compounds with those of polymeric materials. They may be produced in wide variety and with widely diverse solubility and other physical characteristics and hence provide a multitude of materials with different ultimate utilities.

Any polymer hydroperoxide having recurring units containing an aryl nucleus and having a hydroperoxide group attached to a carbon adjacent to at least one of the aryl nuclei may be cleaved in accordance with this invention to produce new polymeric phenols. While there may be hydroperoxide groups also attached to carbons of the polymer chain, there must be at least one hydroperoxide group per molecule attached to a carbon adjacent to an aryl nucleus, which carbon is not one of the carbons of the polymer chain. In other words, to produce the polymer phenols of this invention, the carbon to which the hydroperoxide is attached, and which hydroperoxide group is cleaved to produce the phenol, must be adjacent to the aryl nucleus and separated from the carbons of the polymer chain by at least one carbon of the aryl nucleus. That is, if the aryl nucleus is directly attached to a carbon of the polymer chain, the carbon to which the hydroperoxide group is attached will be in the ortho, and preferably the meta or para, position to the point of attachment to the polymer chain. Hence it will be separated from the polymer chain by at least one carbon of the aryl nucleus and preferably by two or three carbons of the aryl nucleus. In more complex molecules, it may, of course, be even further removed from the carbon chain as in the case where the aryl nucleus is a naphthalene, phenanthrene, etc., nucleus. The hydroperoxide group may be a primary, secondary, or tertiary hydroperoxide group. Thus any polymer hydroperoxide having recurring units containing an aryl nucleus and attached thereto a monovalent alkyl, cycloalkyl, or heterocyclic group wherein there is at least one hydroperoxide group attached to a carbon of one of these substituents on at least one of the aryl nuclei, the carbon being adjacent to the aryl nucleus, may be cleaved to produce the new polymer phenols of this invention. The carbon bearing the hydroperoxide group may be attached to a straight-chain substituent on the aryl nucleus, as, for example, the primary carbon in the case of a methyl group and the secondary carbon adjacent to the aryl nucleus of such substituents as ethyl, n-propyl, n-butyl, methoxymethyl, carboxyethyl, acetylmethyl, benzoylmethyl, hydroxyethyl (in the form of the sulfate ester or as an ether), etc. The hydroperoxide group may also be attached to the secondary or tertiary carbon of a branched-chain substituent, which carbon is attached to the aryl nucleus such as isopropyl, sec-butyl, isobutyl, isooctyl, 1-methoxyethyl-1, 4-chlorobutyl-2, etc. In the same way, the hydroperoxide group may be attached to a carbon adjacent to the aryl nucleus wherein the carbon is a part of a cycloalkyl or a heterocyclic ring (substituted or unsubstituted) such as cyclopentane, cyclohexane, cycloheptane, 4,4-dimethylcyclohexane-1, tetrahydrofuran, piperidine, pyrrolidine, etc., or wherein the cycloalkyl or heterocyclic ring is fused to an aromatic nucleus as in hydrindene, tetrahydronaphthalene, octahydroanthracene, coumarane, dihydro-β-methyl indole, etc.

The aryl nuclei in these polymer hydroperoxides which are cleaved in accordance with this invention may be those of benzene, naphthalene, diphenyl, terphenyl, anthracene, retene, phenanthrene, chrysene, etc. The aryl nucleus and the side chain bearing the hydroperoxide group may also be substituted with a wide variety of groups such as alkyl, chloro, bromo, cyano, carboxyl, sulfonic acid, nitro, etc. Preferably the positions ortho to the aromatic ring carbon bearing the carbon to which the hydroperoxide group is attached are left largely unsubstituted except in fused ring systems.

The polymer hydroperoxides which are cleaved with acid to produce the new polymeric phenols of this invention may be prepared by the oxidation, in liquid phase with a gas containing free oxygen, of any polymer or copolymer of a vinyl, vinylene, or vinylidene monomer which contains an aryl nucleus and an oxidizable hydrogen on a carbon adjacent to the aryl nucleus and separated from the polymer chain by at least one carbon of the aryl nucleus. For example, a polymer of p-ethyl-α-methylstyrene has recurring units containing an aryl nucleus with hydrogen attached to a secondary carbon adjacent to the benzene ring and these secondary hydrogens are oxidizable to produce a polymer hydroperoxide. A polymer of p-isopropyl-α-methylstyrene has recurring units containing an aryl nucleus with hydrogen attached to a tertiary carbon adjacent to the benzene ring and hence may be oxidized to a polymer hydroperoxide. In the same way, a polymer of p-cyclohexyl-α-methylstyrene has a hydrogen attached to a tertiary carbon adjacent to the aryl nucleus and so can be oxidized to a polymer hydroperoxide wherein the hydroperoxide group is attached to a carbon adjacent to an aromatic ring. In some cases, as, for example, p-isopropylstyrene, there is an oxidizable tertiary hydrogen attached to both a carbon of the polymer chain and also to a carbon of an alkyl substituent on the benzene nucleus and adjacent to the benzene nucleus. While both of these hydrogens may be oxidized, the tertiary hydrogen of the isopropyl group is the one most readily oxidized and hence is oxidized first. It is this hydroperoxide group which on cleavage yields a phenolic hydroxyl. Any hydroperoxide groups attached to the tertiary carbons in the polymer chain will also cleave, but in this case the cleavage introduces a ketone group in the polymer chain and splits off phenol. The polymer will then contain units having p-hydroxyphenyl radicals and other units in which the phenyl radical has been split off and a ketone group introduced.

Exemplary of the polymers which may be oxidized to produce the polymer hydroperoxides that are cleaved in accordance with this invention are the polymers and copolymers of vinyl, vinylene, and vinylidene monomers which contain an aryl nucleus and at least one oxidizable hydrogen attached to a carbon adjacent to the aryl nucleus such as p-ethylstyrene, p-isopropylstyrene, p-cyclohexylstyrene, p-ethyl-α-methylstyrene, m- and p-isopropyl-α-methylstyrene, p-cyclohexyl-α-methylstyrene, p-isopropyl-α-chlorostyrene, 3-chloro-5-isopropyl-α-methylstyrene, 3-methyl-5-isopropyl-α-methylstyrene, 3-tert-butyl-5-isopropyl-α-methylstyrene, 3-cyano-5-isopropyl-α-methylstyrene, isopropyl vinyl naphthalene, 2-isopropenyl-4-carboxy-6-isopropyl naphthalene, vinyl, allyl and methallyl ethers and acrylic, methacrylic, etc., esters of such alcohols as p-isopropylbenzyl alcohol, dehydroabietyl alcohol, etc.; vinyl, allyl and methallyl esters of p-isopropylbenzoic acid, dehydroabietic acid, etc. Oxidizable polymers may also be prepared by alkylating already formed polymers containing aromatic rings, as, for example, polystyrene, with propylene, cyclohexene, etc. Also oxidizable for the preparation of the polymer hydroperoxides used in this invention are the copolymers of any of the above-mentioned monomers with comonomers which may or may not contain an aryl nucleus and oxidizable hydrogen, which will satisfy the above requirements, as, for example, acrylonitrile, methacrylonitrile, vinyl chloride, vinylidene chloride, styrene, α-methylstyrene, ethylene, isobutylene, vinyl pyridine, vinyl acetate, allyl acetate, methallyl acetate, maleic anhydride, ethyl fumarate, acrylic acid, methacrylic acid, methyl acrylate, methyl methacrylate, acrylamide, methacrylamide, diethylaminoethyl methacrylate, etc. In addition, many condensation polymers have recurring units which contain an aryl nucleus and the requisite oxidizable hydrogens and are, therefore, capable of producing polymer hydroperoxides which may be cleaved to polymeric phenols, as, for example, polyesters or polyamides such as the ethylene glycol ester or hexamethylenediamine amide of isopropylphthalic acid or of α-isopropylphenylsuccinic acid, etc. Polymers of compounds that polymerize by ring-opening such as isopropylstyrene oxide or isopropyl-α-methylstyrene oxide may also be used. Polymers having aromatic rings bearing more than one group which may be oxidized to a hydroperoxide may also be oxidized and cleaved to a polymeric phenol. For example, polymers and copolymers of 3,5-diisopropyl-α-methylstyrene may be oxidized and cleaved to give a polymer containing substantial amounts of m-dihydroxyphenyl (substituted resorcinol) groups in addition to the monohydroxy-monoisopropylphenyl group. In the same way, polymers containing such aromatic nuclei as 2,6-diisopropylnaphthalene, monoisopropyl tetralin (meta to the hydrogenated ring), 2,7-diisopropylanthracene, etc., may be oxidized and cleaved to produce polymeric phenols. All of these polymers contain an oxidizable hydrogen on a carbon that is adjacent to an aryl nucleus and separated from the polymer chain by at least one carbon of the aryl nucleus and hence may be oxidized to a polymer hydroperoxide that on acid cleavage will yield a polymeric phenol.

The oxidation of the polymer, with a gas containing free oxygen, to produce the polymer hydroperoxides may be carried out under a variety of conditions. Usually the oxidation is carried out by passing the oxygen-containing gas through a solution of the polymer in a suitable solvent. Preferably, the solvent will be one that is inert under the reaction conditions, as, for example, benzene, chlorobenzene, tert-butylbenzene, normal aliphatic hydrocarbons such as n-pentane, n-hexane, n-heptane, etc. Water is a suitable solvent for the oxidation of water-soluble polymers such as the sodium salt of the copolymer of isopropyl-α-methylstyrene and maleic anhydride. In the case of polymers containing methyl-substituted aryl nuclei as the only oxidizable groups, which are not as readily oxidized to polymer hydroperoxides, a co-oxidation procedure may be used to at least partly oxidize them to the corresponding primary hydroperoxides. Such a co-oxidation may involve other oxidizable groups in the same polymer molecule, as, for example, a copolymer of isopropyl-α-methylstyrene with p-methyl-α-methylstyrene or the homopolymer of 3-methyl-5-isopropyl-α-methylstyrene. Alternatively a co-oxidation using an oxidizable solvent may be used, as, for example, the oxidation of the polymer of p-methyl-α-methylstyrene in cumene.

It is frequently desirable to add an initiator, particularly in the case of polymers that are difficult to oxidize. With polymers that are easily oxidized, an initiator may be used to speed up the oxidation. Any free radical-generating agent may be used as an initiator for the oxidation, as, for example, hydroperoxides such as cumene hydroperoxide, p-menthane hydroperoxide, diisopropylbenzene monohydroperoxide, etc., peroxides such as dicumene peroxide, di-tert-butyl peroxide, benzoyl peroxide, diacetyl peroxide, etc., persulfates such as sodium persulfate, peroxycarbonates such as diethyl peroxydicarbonate, etc., and nitrogen compounds such as azobis(isobutyronitrile), etc. The choice of the initiator and the amount of it to be used will depend on the polymer being oxidized, the process used, etc.

A base stabilizer is preferably added to the oxidation reaction mixture but is not required. Exemplary of the bases that may be used are calcium hydroxide, sodium bicarbonate, sodium carbonate, calcium carbonate, ammonia, organic amines such as methylamine, ethylamine, trimethylamine, etc. These bases may be used with or without an aqueous phase present.

Any gas containing free oxygen may be used to carry out the oxidation, as, for example, oxygen, air, or any mixtures of oxygen and nitrogen or other inert gases. The process may be operated at atmospheric or superatmospheric pressure and as a batch or continuous process. The temperature at which the oxidation is carried out will depend upon the polymer being oxidized, the method being used, etc., but, in general, will be within the range of from about 20° C. to about 200° C., and preferably from about 60° C. to about 140° C.

The extent to which the oxidation is carried out will depend upon the number of phenolic hydroxyls desired in the ultimate product. If a polymer monophenol is desired, then only one hydroperoxide group per molecule need be introduced, provided, of course, that it is on a carbon adjacent an aryl nucleus and not a part of the polymer chain. Thus in the case of a polymer containing 1000 monomer units, only 0.1% of the monomer units need be oxidized to ultimately produce a polymer monophenol. On the other hand, if a polymer polyphenol is desired, the oxidation should obviously be continued until more than one hydroperoxide group per molecule has been introduced. While it is theoretically possible to continue the oxidation until substantially all of the oxidizable hydrogens have been oxidized to hydroperoxide groups, this is not generally practicable or necessary, particularly in the case of higher molecular weight polymers, the desirable properties of the polymeric phenol being obtained at a lower degree of phenolic content. Since hydroperoxide groups may be introduced, and then cleaved to phenolic hydroxyls, into polymers of any molecular weight from several monomer units, as, for example, dimers, trimers, tetramers, decamers, etc., up to many thousand monomer units, it will be readily appreciated that the number of hydroperoxide, and ultimately phenol, groups introduced per molecule is largely a function of how large is the polymer being oxidized and also on how many of the hydroperoxide groups are on carbons adjacent to an aryl nucleus and yield phenolic hydroxyls on cleavage and how many are attached to carbons in the polymer chain or elsewhere that on cleavage yield groups other than phenolic hydroxyls. In general, the amount of hydroperoxide groups introduced may be varied from about 0.1% to about 80% of the theoretical value and preferably will be from about 2% to about 60% and more preferably from about 4% to about 50% of the theoretical value.

The crude reaction mixture obtained in the oxidation process may be subjected to acid cleavage to obtain the polymeric phenols of this invention, or the polymer hydroperoxide may be separated and then cleaved. The isolation of the polymer hydroperoxide will, of course, depend upon the oxidation procedure used. For example, if the polymer hydroperoxide is soluble in the reaction medium, it may be precipitated by pouring it into a nonsolvent for the hydroperoxide or if it is insoluble in the reaction medium, it may be removed by filtration, etc.

The cleavage of the polymer hydroperoxides wherein the hydroperoxide group is attached to a carbon adjacent to the aryl nucleus to produce the new polymeric phenols in accordance with this invention is carried out by contacting the polymer hydroperoxide with an acid catalyst. Catalysts capable of decomposing the hydroperoxide groups of the polymer hydroperoxide to produce the polymeric phenols are those materials which act like acids, as, for example, those catalysts generally classified as the acidic condensation catalysts such as strong acids, acid clays, Friedel-Crafts catalysts, cracking catalysts, various phosphorus chlorides, etc. Exemplary of the acid catalysts which may be used are such acids as sulfuric acid, perchloric acid, hydrogen halides such as hydrochloric acid and hydrobromic acid, phosphoric acid, sulfonic acids such as benzenesulfonic acid, p-toluene-sulfonic acid, sulfonated phenol-formaldehyde and styrene-divinylbenzene polymers, and other organic acids such as mono-, di-, and tri-chloroacetic acid and other haloacetic acids, picric acid, nitroacetic acid; acid clays such as montmorillonite, kaolinite, vermiculite, kaolin, fuller's earth, diatomaceous earth, acid-treated bentonite, etc.; cracking catalysts such as phosphoric acid-on-alumina; anhydrous ferric chloride, boron trifluoride, aluminum chloride, zinc chloride, stannic chloride, magnesium chloride, phosphorus trichloride, phosphorus pentachloride, phosphorus oxychloride, etc. Even such weak acid catalysts as acetic acid and propionic acid may be used if the reaction is carried out at an elevated temperature.

The concentration of the catalyst based on the polymer hydroperoxide will depend on the reactivity of the catalyst, the temperature of the reaction, the desired reaction time, and the mode of operation. It may be varied widely but, in general, will be from about 0.01% to about 200% and preferably will be within the range of from about 0.1% to about 10%. When the decomposition is carried out under conditions involving an aqueous phase, a water-soluble acid, either inorganic or organic, may be used. In this case, it is desirable that the concentration of the acid in the aqueous phase be at least about 5% by weight and preferably from about 20% to about 65% by weight, and more preferably from about 20% to about 50% by weight.

The cleavage reaction may be carried out either in the presence or absence of a solvent for the hydroperoxide. The polymer hydroperoxide in either its pure, isolated state or in the form of the crude reaction mixture obtained in the oxidation of the polymer may be treated with the acid catalyst. Although it is generally preferred to cleave polymer hydroperoxides in organic solvents under substantially anhydrous conditions, it may be desirable or more convenient in the case of water-soluble polymer hydroperoxides to use an aqueous process with a water-soluble acid catalyst. The solvent is preferably one that is nonreactive under the conditions of the reaction; that is, it should be nonreactive with the polymer hydroperoxide, the catalyst, or any of the decomposition products. Solvents that may be used for the cleavage reaction include the aliphatic, cycloaliphatic, and aromatic hydrocarbons, alcohols, ketones, ethers, esters, liquid chlorinated hydrocarbons, etc. Exemplary of such solvents are pentane, hexane, heptane, isooctane, cyclohexane, cyclobutane, benzene, toluene, xylene, cumene, chloroform, carbon tetrachloride, ethylene dichloride, methanol, ethanol, propanol, isopropanol, cyclohexanol, acetone, methyl ethyl ketone, diethyl ketone, methyl acetate, ethyl acetate, butyl acetate, diethyl ether, dioxane, etc. In addition, various acidic solvents such as glacial acetic acid, which are inert in the process but which may exert some catalytic activity, may be used. When used, the amount of other catalysts may be reduced. In many cases it will be desirable to use the same solvent in the acid cleavage step as in the oxidation step in the production of these polymeric phenols from various polymers and thereby eliminate the necessity of isolating the polymer hydroperoxide. The concentration of the polymer hydroperoxide in the solvent is limited only by its solubility, reactivity, effectiveness of the catalyst, and the temperature and pressure used.

The temperature at which the cleavage of the polymer hydroperoxide to the polymeric phenol is carried out will depend upon the reaction conditions and may be varied widely, depending principally upon the activity of the acid catalyst used for the cleavage. With strong acids, a temperature of from about 20° C. to about 70° C. is sufficient, but with a very weak acid, much higher temperatures may be required. In general, the decomposition reaction may be effected over a temperature range of from about −80° C. to about 400° C. When using anhydrous conditions, a preferable temperature range is from about 0° to about 200° C. and when using an aqueous phase system, a preferable temperature range is from about 15° C. to about 100° C.

The following examples will illustrate the preparation of the new polymeric phenols in accordance with this invention. All parts and percentages are by weight unless otherwise indicated.

*Example 1*

The polyisopropyl-α-methylstyrenes used in this example and Examples 2 and 3 below were prepared by the low temperature acid polymerization of either mixed isopropyl-α-methylstyrenes or the isolated isomers thereof according to the following typical procedure. Isopropyl-α-methylstyrene was prepared by reducing a commercial diisopropylbenzene monohydroperoxide (mixture of meta and para isomers) and distilling to obtain isopropyl-α,α-dimethylbenzyl alcohol (mixture of meta and para isomers) which was then dehydrated to the mixed isopropyl-α-methylstyrenes. To obtain the individual isomers, this crude mixture was fractionated in a 75-plate column at 50 mm. pressure and a 75:1 reflux ratio whereby a pure m-isopropyl-α-methylstyrene was obtained and a relatively pure p-isopropyl-α-methylstyrene (containing about 4% of the meta isomer and less than 2% of an ortho isomer) was obtained. Sixty parts of either the pure isomers or mixtures of the isomers was polymerized by dissolving in 303 parts of toluene, removing any traces of water, replacing the air with dry nitrogen, and after lowering the temperature to a −70° C., bleeding boron trifluoride into a stream of nitrogen passing into the reaction vessel. There was an immediate exothermic reaction which caused the temperature to rise about 15° C. in a few minutes. After about 30 minutes, the temperature fell to the initial reaction temperature. The polymer was recovered from the viscous reaction mixture by adding the reaction mixture to 2000 parts of a well-agitated methanol. The precipitated polymer was collected by filtration, washed twice with methanol, and then dried at reduced pressure for 16 hours at 80° C.

A polyisopropyl-α-methylstyrene obtained by polymerizing a mixture of the meta and para isomers in the ratio of 1.9:1, respectively, and having a specific viscosity (1% benzene) of 0.06, was oxidized to the corresponding hydroperoxide by co-oxidation in cumene. Fifty parts of the polymer and 2 parts of 75% cumene hydroperoxide were dissolved in 100 parts of cumene and 3 parts of calcium hydroxide was dispersed therein. The reaction mixture was heated and held at 90° C. while an excess of oxygen was introduced into the reaction mixture through a gas disperser. After 73 hours, the reaction mixture had a total hydroperoxide content equivalent to 38.2% cumene hydroperoxide. The insolubles were then removed by filtration. The polyisopropyl-α-methylstyrene hydroperoxide was recovered by precipitation of the reaction mixture into n-pentane. The precipitate so obtained was dried under reduced pressure for 16 hours at room temperature. It was then further purified by dissolving in 110 parts of benzene and reprecipitating with n-pentane. After again drying, there was obtained 46.7 parts of a hard, brittle, yellow resin. Analysis of this resin showed the polyisopropyl-α-methylstyrene hydroperoxide was 47% substituted. In this and the following examples, the hydroperoxide content of the polymer will be expressed as "percent substitution" or "percent substituted," i.e., the number of hydroperoxide groups per 100 oxidizable monomer units in the polymer. It was soluble in methanol, acetone, and benzene and insoluble in water and dilute or concentrated sodium hydroxide. It had a specific viscosity (1% benzene) of 0.05. The total oxygen content by direct analysis was 11.0%, whereas the oxygen present as hydroperoxide was 9.3%, showing that a high yield of hydroperoxide had been obtained.

Ten parts of this 47% substituted polyisopropyl-α-methylstyrene hydroperoxide was dissolved in 90 parts of acetone and 0.55 part of concentrated sulfuric acid was added. An immediate exothermic reaction occurred and the temperature rose from room temperature to 38° C. in 5 minutes. After 0.5 hour, analysis of a 1-cc. aliquot for hydroperoxide indicated that only 7% of the original hydroperoxide remained undecomposed. After 2 hours, only 3% of the original hydroperoxide remained, and after 3 hours, 2.0 parts of sodium bicarbonate and 20 parts of water were added. After another 10 minutes, 1000 parts of water was added. The precipitate so produced was collected by filtration, washed with water, and then dried under reduced pressure for 16 hours at room temperature. The polymeric phenol so obtained amounted to 8.1 parts. It was a light tan powder and was soluble in acetone, methanol, and benzene. It was swollen by 10 or 20% sodium hydroxide and was dissolved therein by adding a small amount of ethanol. It had a specific viscosity (1% benzene) of 0.04. Its ultraviolet absorption was similar to a typical phenol and gave positive proof for the formation of phenol groups. The intensity of the absorption was equivalent to that which would be given by a product containing 36% p-isopropyl phenol. The theoretical content based on a 47% substituted polyisopropyl-α-methylstyrene hydroperoxide would be 47%. This polymeric phenol was found to be an excellent antioxidant when tested in a synthetic lubricant.

*Example 2*

Thirty parts of a polyisopropyl-α-methylstyrene prepared from pure m-isopropyl-α-methylstyrene and having a specific viscosity (1% benzene) of 0.07 was dissolved in 60 parts of tert-butylbenzene containing 0.20 part of 75% cumene hydroperoxide and 0.9 part of calcium hydroxide. The reaction mixture was heated to 110° C. and held at that temperature while an excess of oxygen was passed into the reaction mixture. After 71 hours, the hydroperoxide content of the reaction mixture showed that the polymer was 37.4% substituted. At the end of this time, 250 parts of benzene was added and insoluble calcium hydroxide which remained was removed by centrifugation. The reaction mixture was concentrated by vacuum-stripping at room temperature to 124 parts. The poly-m-isopropyl-α-methylstyrene hydroperoxide was precipitated by adding this concentrated reaction mixture to 1200 parts of n-pentane with agitation. The precipitate was filtered and washed twice with n-pentane, after which the precipitate was dried for 43 hours in vacuo at room temperature. The polymer hydroperoxide so obtained amounted to 27.8 parts and analysis showed that it was 29.4% substituted. It had a specific viscosity (1% benzene) of 0.07. The total oxygen content was 11.6 and the oxygen present as polymer hydroperoxide was 5.9%. Thus this product contained as much of other oxidation products (chiefly polymeric tertiary alcohol along with some polymeric ketone) as hydroperoxide and demonstrates the variations in the product that can be made by controlling oxidation conditions.

Twenty-five parts of this poly-m-isopropyl-α-methylstyrene hydroperoxide was dissolved in 200 parts of acetone, and 1.29 parts of concentrated sulfuric acid dissolved in 25 parts of acetone was added. The temperature rose in 15 minutes from 29° C. to 36° C. and then gradually decreased. After 2 hours, analysis of an aliquot of the reaction mixture indicated that only 4% of the original hydroperoxide remained. After 2.5 hours, 26.5 parts of 1.02 N sodium hydroxide was added to neutralize the sulfuric acid. One thousand parts of water was then added and the precipitate collected, washed with water, and then dried under reduced pressure for 2 days at room temperature. The yield of polymeric phenol so obtained amounted to 20.6 parts which is equivalent to 93% of the theoretical yield. It was soluble in acetone and methanol but was insoluble in benzene. Its ultraviolet absorption was similar to that which would be given by a product containing 30% m-isopropyl phenol (theory=28%).

*Example 3*

Thirty parts of a polyisopropyl-α-methylstyrene, prepared from pure p-isopropyl-α-methylstyrene, having a specific viscosity (1% benzene) of 0.84, was oxidized exactly as described in Example 2. After 17.5 hours of oxidation at 110° C., the reaction solution contained a total hydroperoxide equivalent to 11.0% substitution (based on polyisopropyl-α-methylstyrene charged; 10.5% if corrected for the cumene hydroperoxide added as initiator). The reaction mixture was diluted with an equal volume of benzene and centrifuged and filtered to remove the insoluble calcium hydroxide that remained. The poly-p-isopropyl-α-methylstyrene hydroperoxide was then precipitated by adding the reaction mixture to 2000 parts of methanol with agitation. It was collected by filtration, washed twice with methanol, and dried for 16 hours under reduced pressure at room temperature whereby there was obtained 28.4 parts. Analysis of this product showed that it was 9.9% substituted. It had a specific viscosity (1% benzene) of 0.89 and contained 2.6% total oxygen, the oxygen present as polymer hydroperoxide being 2.0%.

Five parts of this poly-p-isopropyl-α-methylstyrene hydroperoxide was dissolved in a mixture of 15 parts of acetone and 5 parts of benzene. To this solution was added a mixture of 1 part of acetone and 0.11 part of concentrated sulfuric acid, whereupon the temperature of the reaction mixture rose to about 35° C. After 5 hours, analysis of an aliquot of the reaction mixture showed that only 3% of the original hydroperoxide remained. After 18 hours at room temperature, the same hydroperoxide analysis was obtained. The sulfuric acid in the reaction mixture was then neutralized by adding 0.96 part of 1.97 N potassium hydroxide in methanol. After agitating for 1 hour, the polymeric phenol was precipitated by pouring the reaction mixture into 250 parts of methanol. It was collected by filtration, washed once with water and twice with methanol, after which it was dried for 16 hours under reduced pressure at room temperature. Analysis of the product indicated that it contained a maximum of 1% of the original amount of hydroperoxide. It had a specific viscosity (1% benzene) of 0.87. Ultraviolet absorption examination of the product showed the presence of phenolic groups equivalent to 7.9% p-isopropyl phenol (theory=9.1%).

*Example 4*

A copolymer of p-isopropyl-α-methylstyrene and methacrylic acid was prepared by copolymerization of the two monomers in a 1:3 mole ratio in benzene solution at 65° C. using benzoyl peroxide as the catalyst. After 19 hours, the copolymer had precipitated out to make the entire reaction mixture a solid mass. The copolymer was collected by filtration, washed with benzene, and dried. It was insoluble in water, but was soluble in dilute alkali and ethanol. It had a specific viscosity of 0.27 (1% ethanol) and an acid number of 415 (theory for methacrylic acid is 652). Based on the acid number, the copolymer contained 36.3% p-isopropyl-α-methylstyrene.

This p-isopropy-α-methylstyrene-methacrylic acid copolymer was oxidized by bubbling oxygen through a solution comprising 7.91 parts of the copolymer, 2.60 parts of sodium hydroxide, 21.1 parts of tert-butyl alcohol, 0.38 part of potassium persulfate, and 55.6 parts of water at 65° C. for 43 hours. The reaction mixture was then diluted with about 60 parts of an 80:20 water: tert-butyl alcohol mixture and the product was precipitated by adding about 20 parts of glacial acetic acid. About 300 parts of water was added and the gelatinous precipitate was centrifuged out. The precipitate was resuspended in water, recentrifuged, filtered to a paste, washed with water, and finally dried. An iodometric analysis of the product showed it to have 4.1% of its p-isopropyl aryl groups converted to hydroperoxide.

A polymeric phenol was prepared from this hydroperoxide of p-isopropyl-α-methylstyrene-methacrylic acid copolymer by acid cleavage. Two parts of the hydroperoxide was dissolved in 20 parts of a 75:25 mixture of acetone and water and 0.4 part of sulfuric acid was added. The reaction mixture was refluxed for 6 hours, after which the sulfuric acid was neutralized by adding 1.6 parts of 5 N aqueous sodium hydroxide. The product was then precipitated by adding the reaction mixture to 200 parts of water with agitation. It was separated by filtration, washed twice with water, and then dried for 16 hours at room temperature under reduced pressure. Iodometric analysis showed that at least 92% of the hydroperoxide had been decomposed. Ultraviolet absorption examination indicated that in addition to phenolic groups there was present in the polymeric phenol another chromophoric group. The latter group is believed to be an acetyl group which could have arisen by ester formation between the phenol groups and the methacrylic acid groups followed by a Fries rearrangement to an acetyl-substituted phenol.

The foregoing examples have illustrated the preparation of the new polymeric phenols in accordance with this invention from low to high phenol content and from low to high molecular weight. Thus, it may be seen that by the proper choice of the polymer being oxidized, it is possible to produce a polymer hydroperoxide and in turn a polymer phenol having almost any desired physical properties. Polymeric phenols having very different solubility properties may be prepared and the foregoing examples have shown the preparation of polymer phenols that differ markedly in their solubility in organic solvents. Water-soluble polymer phenols can be prepared by copolymerizing a water-insoluble, but readily oxidizable, monomer such as isopropylstyrene, isopropyl-α-methylstyrene, p-cyclohexylstyrene, etc., with a monomer which will contribute water solubility or which can be saponified or altered to give water solubility. Exemplary of the monomers which will contribute or may be altered to contribute water solubility to the polymer, and hence to the polymer hydroperoxide and polymer phenol, are such monomers as maleic anhydride, sodium acrylate, sodium methacrylate, methyl acrylate, methyl methacrylate, acrylonitrile, diethylaminoethyl acrylate, carboxystyrene, styrenesulfonic acid, etc. Such copolymers as these may be prepared by free radical polymerization and then can be oxidized in aqueous solution to yield water-soluble polymer hydroperoxides which can be cleaved to yield water-soluble polymeric phenols.

In addition to varying the polymer which is oxidized and then cleaved, it is possible to further vary the nature of the polymer phenol and hence its utility by varying the conditions under which the oxidation of the polymer is carried out, as, for example, varying the base stabilizer used, the oxidation catalyst that may be used, the temperature of oxidation, etc. In this way it is possible to produce polymer hydroperoxides having, in addition to the hydroperoxide groups, other oxygenated groups such as alcohol, ketone, and peroxide groups which may or may not yield phenol groups in the final product. The oxidizable polymer may contain, in addition to the hydrogen which is oxidized to a hydroperoxide group and subsequently cleaved to a phenol, oxidizable hydrogen which will yield a hydroperoxide group but which will not cleave to a phenol group, but rather will yield a ketone, aldehyde, ester, etc., group. For example, polymer hydroperoxides containing hydroperoxide-bearing carbon atoms in the polymer chain as well as attached to an aromatic ring, as in the case of a polyisopropylstyrene hydroperoxide, on acid cleavage will yield a polymer containing both ketone and phenolic groups. This affords another means of varying the nature of the polymeric phenol. The cleavage conditions can also be varied widely, as, for example, with respect to time, temperature, acid catalyst, etc., to give widely varying products. For example, the hydroperoxide groups can be partly or completely cleaved, by-product tertiary alcohol groups can be left as such or partly or completely dehydrated to the corresponding olefin. The latter may then be reacted with phosphorus pentasulfide to prepare useful corrosion inhibitor-antioxidants. The polymer phenols may also be advantageously modified after preparation by utilizing the great reactivity of phenols to provide other useful products or to permit novel but practical uses.

It is then evident that the wide variation available in the nature of the oxidizable polymer will offer materials of widely diverse solubility, physical characteristics, and ultimate utility. For example, it is possible to prepare polymer phenols that are soluble in aliphatic hydrocarbons, lubricating oils, aromatic hydrocarbons, ester, alcohols, ketones, water, etc., and, in addition, they can be prepared as liquids, amorphous solids, and crystalline solids of low to high melting point.

The new polymeric phenols of this invention have all of the advantages of the prior art phenols plus the many advantages that accrue to them because of their polymeric nature and wide variability. All of the useful reactions of low molecular weight phenols (mono- and polyfunctional) may be applied to these polymer phenols to produce new materials having wide utility. A few of the many such applications are discussed below.

The polymer phenols may be readily alkylated with conventional alkylation acid catalysts such as boron trifluoride, hydrogen fluoride, sulfuric acid, phosphoric acid, etc., with a wide variety of olefins or alkyl halides, as, for example, ethylene, propylene, isobutylene, nonenes, ethyl chloride, allyl chloride, etc. The polymer phenols can also be ortho-alkylated with ethylene oxide to produce ortho-hydroxyethyl or vinyl compounds. Ortho-allyl or ortho-benzyl polymer phenols may be prepared by reacting the alkali metal salt of a polymer phenol with an allyl halide or benzyl halide. These alkyl-substituted polymer phenols are more soluble in petroleum oils and more compatible with hydrocarbon polymers such as elastomers, polyethylene, polystrene, etc. They may be used as antioxidants and lubricating oil additives (as viscosity index and pour point improvers, corrosion inhibitors, etc.)

The polymer phenols can be chlorinated, brominated, etc. Polymer phenols that are partly or completely chlorinated may be used as insecticides, bactericides, fungicides, wood preservatives, flameproofing agents, etc. The polymer phenols may also be mercuriated to yield useful bactericides and fungicides.

The polymer phenols in the form of their alkali metal salts can be reacted with epichlorhydrin to produce polymer epoxides having one epoxide group attached to each phenol group. These polyepoxides may be used as plastics, film formers, elastomers, protective coatings, adhesives, etc., and may, furthermore, be cross-linked by reacting them with polyfunctional alcohols in the presence of base catalysts or amines, or polyfunctional acids, etc. These polyepoxides are useful as stabilizers for chlorinated compounds such as polyvinyl chloride, chlorinated rubber, chlorinated insecticides, etc., being excellent hydrogen chloride acceptors. The epoxide group in these polyepoxides will, of course, provide a ready means of attaching many diverse types of low to high molecular weight useful groups which contain at least one active hydrogen as dyes, weed killers, insecticides, detergents, polymers (to form graft polymers), etc. The polyepoxides may also be used as textile- and paper-treating agents since they may be very readily bound chemically to the surface by reaction with active hydrogens in these polymers.

The polymer phenols may be partly or completely nitrated to yield useful bactericides, fungicides, insecticides, and explosives. The nitrated polymer phenols may be reduced to the corresponding aminophenols which have many uses, as, for example, in the preparation of dyes by the diazotization of the amino group and subsequent coupling. The nitrated polymer phenols may also be reduced to the corresponding oximes. Similarly, the polymer phenols may be sulfonated to yield useful water-soluble products which may be cross-linked to give ion exchange resins.

Salts of the polymer phenols such as the lead, cadmium, stannous, barium, calcium, sodium, potassium, and the basic salts of polyvalent metals, etc., can be readily prepared by reacting the polymer phenol with the corresponding hydroxide, alkoxide, or a hydrocarbon derivative, as, for example, tetraethyllead. These salts may be used as stabilizers for chlorinated compounds and as oil detergents and additives. They will also undergo etherification, esterification, etc. For example, they can be reacted with anhydrides such as acetic anhydride, maleic anhydride, phthalic anhydride, etc., to form the corresponding esters. Obviously these polymer phenols will undergo many other types of reactions, as, for example, the Kolbe reaction to yield carboxyphenols, the Fries rearrangement to yield phenolic ketones, etc. The phenol group can be replaced partly or completely with amine groups by heating the polymer phenol with a zinc chloride-ammonia adduct. Polymer polyphenols containing dihydric phenol groups, as, for example, the substituted resorcinol and hydroquinone groups, can be used as reducing agents, particularly as photographic developers, and the para type may be oxidized to the corresponding reactive polyquinones. The polymer phenols may be reacted with phosphorus-containing compounds such as phosphorus sulfide, phosphorus trichloride, phosphoric acid, etc., and with sulfur-containing compounds such as sulfur, polysulfides, etc., to produce compositions useful as flameproofing agents, antioxidants, lubricating oil additives, etc. The polymer phenols will also undergo Gatterman's reaction for the preparation of phenolic aldehydes by treating the polymer phenol with a mixture of anhydrous hydrogen cyanide and hydrogen chloride. The Riemer-Tiemann method of treating phenols with chloroform in the presence of excess potassium hydroxide may also be applied. These phenolic aldehydes may, of course, be used to prepare polymeric dyes.

It is apparent that the new polymer phenols of this invention may be used for a wide variety of applications. Obviously there are undoubtedly many other modifications and uses which will occur to those skilled in the particular arts involved. Every application will, of course, not necessarily be usable with all possible polymer phenol compositions because of the differences in solubility, reactivity, or other considerations. Nevertheless, some member of the wide class of polymer phenols disclosed herein will be operable and useful in these applications. Some of the more specific uses will be pointed out below.

One of the basic advantages of these polyphenols over low molecular weight phenols is in the fact that they are nonvolatile, odorless, nonmigratory, and polyfunctional. Consequently, they are particularly useful as antioxidants and stabilizers, as, for example, as viscosity index improvers and pour point depressants in lubricating oils (both petroleum and synthetic lubricants), etc. For instance, the polymeric phenol described in Example 1 was found to be an effective antioxidant when tested in a synthetic lubricant. These polymer phenols may also be used as antioxidants and stabilizers in elastomers, as, for example, natural rubber, GR-S, polybutadiene, butadiene-acrylonitrile, neoprene, chlorinated polyethylene, etc., or in plastics such as polyethylene, polyvinyl chloride, polystyrene, ethyl cellulose, cellulose acetate, nitrocellulose, etc., or in synthetic fibers made from such polymers as nylon, polyacrylonitriles, ethylene terephthalate polymers, polyvinyl chloride, cellulose acetate, etc., or in protective coatings such as varnishes, lacquers, paints, or in unsupported films of such materials as polyethylene, ethylene, terephthalate polymers, ethyl cellulose, nitrocellulose, natural rubber, etc. Because of the nonvolatility of these antioxidants, i.e., the new polymer phenols of this invention, many of these products can be used at higher temperatures than previous antioxidants. They will also be useful as antiskinning agents for paints and varnishes and as excellent polymerization inhibitors for storing monomers or for shortstopping polymerization reactions in bulk, suspension, or emulsion polymerization. The polymeric phenols may be added to the material to be stabilized, etc., in a wide variety of ways. They may be dissolved in a polymer melt with the aid of some solvent, or milled in or added as a dispersion in a solvent, or dissolved in solvent solution of the polymer prior to fiber forming film forming, etc. The water-soluble polymer phenols will be especially good shortstoppers for emulsion polymerization and will be good antioxidants for such water-soluble polymers as polyvinyl alcohol, methyl cellulose, carboxymethylcellulose, etc. In addition, the water-soluble polymer phenols may be conveniently deposited from water solution on a wide variety of surfaces (wood, metal, fibers, textiles, films, plastics, etc.) and fixed as insoluble salts or by subsequent treatment to protect such surfaces against oxidation and/or deterioration due to corrosion or to microbiological attack.

An outstanding use of these new polymeric phenols is in the preparation of an entirely new class of polymeric dyes. Such polymeric dyes are very useful because of their permanent nonmigratory properties. They are important as photographic, textile, paper, pigment, plastics, wood, etc. dyes. In many cases, the dye-forming reactions can be carried out in situ by fixing the polymer phenol on the surface or in the article to be dyed and then passing the article through a bath containing the required dye-forming ingredients. Polymeric dyes are of particular importance in the production of colored synthetic fibers since they may be incorporated as such in the spinning melt or solution, or the polymer phenols may be incorporated in the fiber-forming material such as cellulose acetate, viscose, etc., prior to spinning and the spun thread then coupled with a diazo base. Hence they provide a means of obtaining a permanently colored fiber in an extremely wide range of colors.

Many different types of polymeric dyes may be prepared from these polymer phenols. Azo dyes may be prepared from polymeric phenols in general, and particularly from those wherein either part or all of the aryl nuclei and naphthalene, phenanthrene, anthracene, etc., which aryl nuclei may be unsubstituted or substituted with nitro, carboxyl, sulfonic acid, alkyl, aryl, acetyl, aldehyde, etc., substituents, by coupling the polymer phenol with a diazonium salt, as, for example, the diazonium salts prepared from aniline, sulfanilic acids, sulfonated naphthylamine, etc. Such polymeric dyes may be conveniently insolubilized (if not already insolubilized by another reaction prior to dye formation) by forming metal salts through the sulfonic acid or carboxy groups in the original polymer phenol or added during the coupling process. Polymer phenols which have been reacted upon to introduce a carboxyl group ortho to the phenolic hydroxyl may also be condensed with an aminonaphthol through the amine group to yield products which can be coupled with diazonium salts. The coupling reaction may be carried out either in an organic solvent solution of the polyphenol, as, for example, in pyridine, or by a water emulsion or a water dispersion technique in the presence of alkali.

Polymeric azomethine dyes, which are particularly useful as photographic dyes, may be prepared by condensing aromatic amines with polymeric phenol derivatives containing an aldehyde group ortho to the phenolic hydroxyl. The polymer phenols may also be converted into nitroso dyes by reaction with nitrous acid. This is particularly true with polymer phenols which contain sulfonated naphthol groups. The polymer phenols may be nitrated to produce useful dyes. Sulfur dyes may be prepared from the polymer phenols, and in particular from the nitro derivatives of the polymer phenols, by heating them with sulfur or polysulfides. Color-coupling or quinoneimine-type photographic dyes may be prepared by coupling the polymer phenols with aromatic amines in the presence of oxidizing agents such as silver bromide (as in photographic film) to form polymeric dyes. Such dyes are useful in color photography.

The following examples illustrate the preparation of a few typical polymeric dyes that may be prepared from the new polymeric phenols of this invention.

*Example 5*

A pyridine solution of the polymeric polyphenol produced in Example 2 above was added drop by drop to a cold aqueous solution of benzenediazonium chloride. A yellowish-brown precipitate formed which was separated and reprecipitated from dioxane with water and then was washed with a dilute solution of hydrochloric acid and water. The azo dye so prepared was a reddish-black color which when deposited from an acetone solution onto wood gave a yellow color and dyed white cotton broadcloth yellow. On analysis it was found to contain 7.11% nitrogen.

*Example 6*

A portion of the polymeric polyphenol produced in Example 2 above, finely powdered, was placed in a 20% aqueous solution of sodium hydroxide. The mixture was agitated to thoroughly wet the powdered polymeric phenol. It was then cooled in an ice bath, and a cold aqueous solution of benzenediazonium chloride was slowly added. After ½ hour the polymer was quite dark and it was then separated, washed with dilute acid and water, whereby there was obtained a reddish-black dye. A solution of this dye in alcohol was orange-colored. It dyed white broadcloth yellow.

*Example 7*

The polymeric polyphenol produced in Example 2 above, 1.4 parts, was well-mixed with 0.4 part of sulfur and then was heated for 2 hours, the temperature of the heating bath rising from 60° to 220° C. in the 2 hours. The lumps of orange-colored, streaked product were broken up and then reheated to 190° C., whereby there was obtained an orange even-colored dyestuff. It was insoluble in ethanol, methyl ethyl ketone, and dioxane.

*Example 8*

A portion of the polymeric polyphenol produced in Example 2 above was nitrated by suspending it in concentrated nitric acid and holding it at a salt-ice bath temperature for 6 hours and then at 0° C. for 16 hours. The solid polymer was then washed with water whereby there was obtained a yellow-colored product, which on analysis was found to contain 4.8% nitrogen.

Many of the new polymeric phenols of this invention may be used for the preparation of synthetic fibers, as, for example, a copolymer of acrylonitrile with isopropyl-α-methylstyrene which has been oxidized to the hydroperoxide and then cleaved to the polyphenol, or a copolymer of methyl terephthalate with ethylene glycol containing a small amount of an isopropyl aryl dibasic acid, or glycol may be similarly converted to a polymer phenol. Such copolymer fibers have better dyeing properties and, in fact, the dye may be chemically bound to the fiber as described above in the discussion on preparation of polymeric dyes. In addition, various polymer phenols may be blended physically with fiber formers, as, for example, in the melt for melt-spun fibers such as Dacron (an ethylene terephthalate polymer) and nylon, or in solution for solution-spun fibers such as acrylonitrile copolymers, cellulose acetate, viscose, etc. The addition of the polymer phenols to these fiber formers will provide improved aging properties, resistance to microbiological attack, plasticization, and will also permit improved dyeing of the fiber by formation of the dye in situ by coupling or by other reactions of the polymer phenols. Such fibers will also have improved surface properties such as feel, antistatic behavior, etc. The polymer phenols or their methylolated, sulfonated, chlorinated, etc., derivatives may be applied by means of solution to the already-formed fiber or cloth as sizing agents, antistatic agents, creaseproofing agent, waterproofing agents, antioxidants, bactericides, etc.

The high molecular weight polymer phenols may be used as plastics and film formers. Useful plastics and film formers may also be prepared from low to high molecular weight polymer phenols by intermixing them with addition polymers such as polyvinyl chloride, natural rubber, GR–S, butadiene-acrylonitrile, polyethylene, polystyrene, polyacrylonitrile, etc., or with condensation polymers such as phenol-formaldehyde, urea-formaldehyde, melamine-formaldehyde, nylon, polyethylene terephthalate, etc., polymers, or with cellulosic polymers such as ethyl cellulose, cellulose acetate, and nitrocellulose. The polymer phenols of from low to high molecular weight may be cross-linked to produce useful film formers with such materials as diisocyanates and dialdehydes such as hexamethylene diisocyanate, adipaldehyde, terephthalic dialdehyde, and isophthalic dialdehyde or by heating with partially formed phenol-formaldehyde or urea-formaldehyde resins or by heating with polyfunctional epoxides such as the Epon resins or by heating in the presence of formaldehyde or a source of formaldehyde or other aldehydes such as acetaldehyde, benzaldehyde, furfural, etc., or by heating in air or with peroxide catalysts or by heating with a base in the presence of epichlorhydrin. Some of the polymer phenols may be plasticized, alone or when admixed with other polymers, to yield useful plastic and film-forming compositions. In addition, certain of the polymer phenols will be useful as polymeric plasticizers and in some cases may be used as a combined plasticizer and stabilizer.

Among the important uses of the polymer phenols is their use as modifiers of conventional phenol-formaldehyde resins or as the sole phenol ingredient of this type of resin. Such materials may be advantageously used in the very diverse applications of the conventional phenol-formaldehyde resins, as, for example, in molding, laminating, protective coatings, adhesives, and casting resins. To produce such resins the polymer phenol may be dissolved or intermixed with phenol or a substituted phenol such as the cresols, tert-butyl phenol, nonyl phenol, etc., and reacted with formaldehyde in the conventional way under alkaline conditions to form a resole which is then used in the conventional way. Alternatively, the polymer phenol may be methylolated with formaldehyde under alkaline conditions, or under certain conditions such as a dilute solution and/or in the presence of a monomeric phenol with acid catalysts. Such methylolation may conveniently be carried out in aqueous solution or aqueous suspension or in an organic solvent such as alcohol, benzene, etc., depending upon the nature of the polymeric phenol in the presence of a basic catalyst (soluble or insoluble) and a source of formaldehyde such as aqueous formaldehyde, gaseous formaldehyde, paraformaldehyde, or hexamethylenetetramine. The methylolated polymer phenol can then be recovered by filtration, evaporation of the solvent, or by solvent precipitation followed by filtration and drying. Many such methylolated polymer phenols may be conveniently insolubilized by heating and thus may be used as such for many phenol-formaldehyde type compositions. Just as in the case of phenol-formaldehyde resins, other aldehydes may be used in place of formaldehyde, as, for example, acetaldehyde, chloral, butyraldehyde, crotonaldehyde, acrolein, benzaldehyde, furfural, etc., either alone or in combination with formaldehyde. The following two examples will illustrate the preparation of a typical polymer phenol-formaldehyde resin and a typical methylolated polymer phenol and the insolubilization thereof.

*Example 9*

A polymeric polyphenol was prepared from a 2:1 mixture of meta- and para-isopropyl-α-methylstyrene polymer as described in Example 1 above. On analysis it contained 31% isopropyl phenol and had a specific viscosity (1% benzene) of 0.11. Six parts of this polyphenol was dissolved in 24 parts of a 60:40 by weight alcohol-water mixture along with 0.542 part of sodium hydroxide. Paraformaldehyde (0.528 part) was added and the mixture was refluxed at 80° C. for 35 minutes. The color of the reaction mixture at first decreased in depth and then slowly darkened as the refluxing was continued. The product finally precipitated out and was insoluble in boiling acetone.

*Example 10*

Two parts of the polymeric polyphenol described in Example 9 was dissolved in 50 parts of ethanol along with 0.12 part of sodium hydroxide. The reaction mixture was heated to reflux and 0.404 part of paraformaldehyde was added. After 2 hours refluxing, 2 moles of formaldehyde had been consumed per mole of phenol present. The reaction mixture was then diluted with water and neutralized with dilute hydrochloric acid. The resin was extracted with ether and the ethereal layer was evaporated to yield a white product which was soluble in dioxane and dimethylformamide. This methylolated polymeric polyphenol was insolubilized by heating it in an atmosphere of nitrogen for 4 hours at 170° C. The original polymer phenol was unaffected by this treatment.

The methylolated polymer phenols described above may be blended with the various fillers or extenders that are used with conventional phenol-formaldehyde resins, as, for example, asbestos, paper, cotton, fabric (such as cotton or glass), glass fibers, wood flour, etc., to make compression molded articles at either low or high pressure, although lower pressures can be used with these materials than with the conventional phenol-formaldehyde resins, or to make cast articles. They may also be used as laminating resins for binding thin sheets of fabric, paper, or plastic film together. Here, too, lower pressures may be used than with the conventional phenol-formaldehyde resins. They may also be used for making resin-bonded plywood and for impregnating wood to densify and improve its properties. They may be used in many adhesive applications as for bonding abrasives (grinding wheels, sandpaper), bonding cork for floor coverings, brake linings, bonding sand for shell moldings, etc. The methylolated polymer phenols may also be used as protective coatings, alone when applied from solution or emulsion, or intermixed with other conventional protective coating ingredients such as drying oils, alkyd resins, latex paints, lacquers, etc. In many of these applications it may be advantageous to apply the methylolated polymer phenol from a solution (aqueous or in an organic solvent) or as a dispersion in water, particularly where impregnation is desirable. After application, the article or surface may be insolubilized by heat while forming or after forming, or by a longer room temperature cure with or without an added catalyst, either base or acid catalyst.

The methylolated polymer phenol or the original polymer phenol may be advantageously utilized in the above uses by combining them with small to large amounts of monomeric phenols or monomeric dihydric phenols as such or after they have been converted by the well-known reactions with formaldehyde into a resole or a Novalak-type resin. Under these conditions it may be desirable to add further formaldehyde (hexamethylenetetramine) or additional base or acid catalyst.

The polymer phenol or its methylolated derivative may be added to paper pulp in the beater in varying amounts and precipitated thereon by either acidic or basic agents, depending upon the nature of the polymeric phenol. Better retention and bonding will be obtained by use of these polymeric phenols than with the prior art pulp resin preforms. Many of the polymer phenols and/or their methylolated derivatives when added in smaller amounts to paper pulp in this way will improve one or more of the properties of the paper such as wet strength, dry strength, resistance to penetration by water and inks, aging, etc.

A novel and useful way of utilizing these new polymer phenols in phenol-formaldehyde type applications, and in certain other applications where conditions will permit, is to use the polymer hydroperoxide in the presence of an acid catalyst (preferably a mild one such as acetic acid, formic acid, oxalic acid, or dilute mineral acids, or acid earths or acid fillers, etc.), and then carry out the cleavage reaction to the phenol during a higher temperature curing and/or forming operation with or without an added aldehyde present. Under these conditions the aldehyde will not, of course, be necessary to obtain an insoluble product since a certain amount of thermal decomposition of the hydroperoxide groups will provide the desired cross-linking function. An interesting case for the use of this procedure is found in the case of polymer hydroperoxides containing primary and/or secondary hydroperoxide groups, and particularly when attached to a fused ring system, as, for example, a polymer containing a tetralin- or hydrindene-type hydroperoxide group. In this case, acid cleavage yields not only a phenol group but also an aldehyde group (butyraldehyde or propionaldehyde) attached to the same aromatic ring. Thus both functional groups necessary for a phenol-aldehyde resin are present in situ and in a non-volatile, polymer form. Such polymer hydroperoxides may also be cleaved in the normal manner by using mild controlling conditions to yield the polymer phenol-aldehyde composition in a soluble but very useful form. Primary polymer hydroperoxides and secondary polymer hydroperoxides which do not contain fused ring systems will also be useful in the same manner since both a phenol group and an aldehye are formed. For example, polymers having hydroperoxide groups attached to the carbon of a methyl group adjacent to a benzene ring yield a phenol and formaldehyde on acid cleavage. Polymers having hydroperoxide groups attached to the carbon of an ethyl group and adjacent to a benzene ring yield a phenol and acetaldehyde on acid cleavage. Longer side chains such as n-butyl, n-nonyl, etc., will give much less volatile aldehydes. However, conventional pressure equipment will give satisfactory results where the more volatile aldehydes are present.

The methylolated polymer phenols will also provide useful compositions when intermixed with various polymers and cured, particularly in the case of polymers containing free hydroxyls such as polyvinyl formal, partially acetylated or ethylated cellulose, etc.

Most of the well-known phenolic resins lack the valuable proper of elasticity. However, elastomers containing phenol groups may be prepared from the new polymeric phenols of this invention in a number of ways. For example, an isopropyl-α-methylstyrene-isobutylene or ethylene copolymer having a preponderant amount of isobutylene or ethylene may be oxidized and subsequently subjected to acid cleavage to produce the corresponding rubbery polymer phenol. An ethyl acrylate polymer may be partly reacted by ester interchange with an alcohol containing isopropyl aryl groups and then converted via oxidation and acid cleavage to the corresponding rubbery polymer phenol. Such rubbery polymer phenols may be conveniently vulcanized by the many cross-linking reactions noted above for the polymeric phenols.

Interesting and useful compositions may be prepared by blending these new polymer phenols and their derivatives with natural and synthetic rubbers, as, for example, GR–S, butadiene-acrylonitrile, neoprene, butyl rubber, etc. Of particular interest in this connection is the use of methylolated polymer phenols which yield on curing tough, vulcanized products. These polymer phenol-rubber blends will have far superior aging properties.

In addition to the numerous protective coating possibilities already mentioned, various derivatives of the polymer phenols, as, for example, a one-mole ethylene oxide adduct or polyepoxide, etc., may be esterified with various fatty acids, either drying or nondrying, to provide a wide variety of materials useful in protective coatings. Some of these materials will be waxlike in nature, depending upon the polymer phenol used as the starting material, etc., and hence may be useful as synthetic waxes. Some of the poly-mole ethylene oxide adducts of certain of the polymeric polyphenols will also be useful as waxlike substances. Certain of the polymer phenols and their derivatives may be useful as surface active agents, particularly the water-soluble polymer phenols and derivatives which contain substantial amounts of polar and nonpolar groups, as, for example, the polymeric polyphenols prepared from isopropyl-α-methylstyrene-methacrylic acid copolymers and isopropyl-α-methylstyrene-diethylaminoethyl methacrylate copolymers. The less nonpolar polymer phenols may be reacted with ethylene oxide, propylene oxide, or ethyleneimine and these may be used as such or further reacted with chloroacetic acid, chlorosulfonic acid, mineral acids, etc., to produce surface active agents. These materials will be useful as detergents and detergent aids, emulsifiers, as for emulsion polymerization, emulsion stabilizers, flocculating agents, foaming agents, defoamers, de-emulsifiers, oil well drilling mud additives, leather tanning agents, flotation agents, textile- and paper-treating agents, corrosion inhibitors, soil conditioners, bactericides, fungicides, weed killers, waterproofing agent, etc.

This application is a continuation-in-part of my application Serial No. 329,132, filed December 31, 1952.

What I claim and desire to protect by Letters Patent is:

1. A styrene polymer containing each of the following recurring units

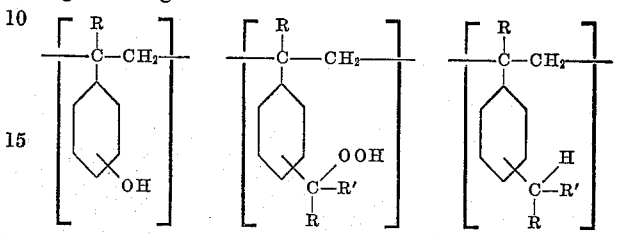

where R is selected from the group consisting of hydrogen and methyl and R′ is a lower alkyl radical, said polymer containing from about 0.02% to about 0.3% hydroperoxide oxygen.

2. A polymer of isopropyl-α-methylstyrene containing each of the following recurring units

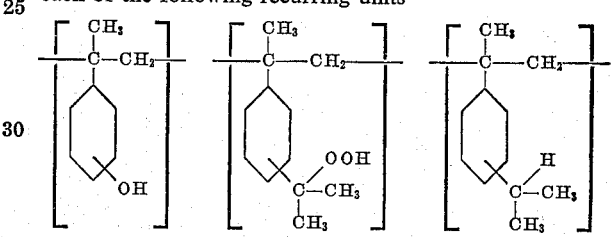

said polymer containing from about 0.02% to about 0.3% hydroperoxide oxygen.

3. A copolymer of isopropyl-α-methylstyrene and methacrylic acid containing each of the following recurring units

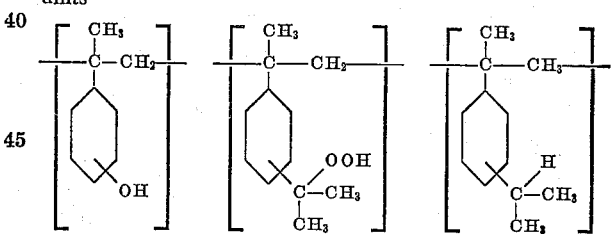

said polymer containing from about 0.02% to about 0.3% hydroperoxide oxygen.

References Cited in the file of this patent
UNITED STATES PATENTS

| | | |
|---|---|---|
| 2,583,638 | Evans | Jan. 29, 1952 |

FOREIGN PATENTS

| | | |
|---|---|---|
| 629,429 | Great Britain | Sept. 20, 1949 |
| 679,374 | Great Britain | Sept. 17, 1952 |

UNITED STATES PATENT OFFICE
CERTIFICATE OF CORRECTION

Patent No. 2,911,387            November 3, 1959

Edwin J. Vandenberg

It is hereby certified that error appears in the printed specification of the above numbered patent requiring correction and that the said Letters Patent should read as corrected below.

Column 17, line 12, for "proper" read — property —; column 18, line 42, right-hand unit, upper right-hand portion of the formula, for "$CH_3$" read — $CH_2$ —.

Signed and sealed this 12th day of April 1960.

(SEAL)
Attest:

KARL H. AXLINE
Attesting Officer

ROBERT C. WATSON
Commissioner of Patents